United States Patent
Kotreka et al.

(10) Patent No.: US 9,408,130 B1
(45) Date of Patent: Aug. 2, 2016

(54) METHOD FOR MANAGING CELL RESELECTION IN MULTI-SUBSCRIBER IDENTITY MODULE DEVICES

(71) Applicant: QUALCOMM Incorporated, San Diego, CA (US)

(72) Inventors: Ravi Kanth Kotreka, Hyderabad (IN); Ankur Srivastava, Hyderabad (IN); Kranthi Kumar Guduru, Hyderabad (IN)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/645,176

(22) Filed: Mar. 11, 2015

(51) Int. Cl.
*H04W 36/00* (2009.01)
*H04W 36/30* (2009.01)
*H04W 24/08* (2009.01)
*H04W 76/06* (2009.01)

(52) U.S. Cl.
CPC ............ *H04W 36/30* (2013.01); *H04W 24/08* (2013.01); *H04W 76/068* (2013.01)

(58) Field of Classification Search
CPC .... H04W 36/30; H04W 76/068; H04W 24/08
USPC ....................................................... 455/436
See application file for complete search history.

(56) References Cited

U.S. PATENT DOCUMENTS

| 7,830,853 | B2 | 11/2010 | Abrahamson et al. |
| 8,274,938 | B2 | 9/2012 | Chang et al. |
| 8,805,444 | B2 | 8/2014 | Han et al. |
| 2009/0156256 | A1 | 6/2009 | Shi |
| 2010/0093356 | A1* | 4/2010 | Lee ................. H04W 4/20 455/437 |
| 2010/0136975 | A1 | 6/2010 | Onishi |
| 2011/0080895 | A1* | 4/2011 | Iwamura ........... H04W 36/0083 370/332 |
| 2012/0264425 | A1 | 10/2012 | Krishnamoorthy et al. |
| 2013/0237197 | A1* | 9/2013 | Ruvalcaba ............ H04W 8/183 455/418 |
| 2013/0260761 | A1 | 10/2013 | Walke et al. |
| 2013/0303240 | A1* | 11/2013 | Sanka .................. H04B 1/3816 455/558 |
| 2014/0071940 | A1 | 3/2014 | Swaminathan et al. |

FOREIGN PATENT DOCUMENTS

EP 2466970 A1 6/2012

OTHER PUBLICATIONS

Wang, "A Novel Cell Reselection Method in the Scenario of Multi-RAT" 2013 International Conference on Cyber-Enabled Distributed Computing and Knowledge Discovery (CyberC), Issue Date: Oct. 10-12, 2013.*
International Search Report and Written Opinion, PCT/US2016/019398—ISA/EPO—May 11, 2016.

* cited by examiner

*Primary Examiner* — Juan A Torres
(74) *Attorney, Agent, or Firm* — Procopio, Cory, Hargreaves & Savitch LLP

(57) ABSTRACT

A method for cell reselection for a mobile communication device includes: selecting a best neighbor cell of a currently serving cell for a first subscription; starting a reselection timer; performing a plurality of signal measurements on the best neighbor cell; determining if a time period indicated by the reselection timer is expired; in response to a determination that the time period is expired, determining if a second subscription is engaged in an activity having higher priority than cell reselection; and in response to a determination that the second subscription is engaged in the activity having higher priority than cell reselection, inhibiting cell reselection on the first subscription.

20 Claims, 3 Drawing Sheets

METHOD FOR MANAGING CELL RESELECTION IN MULTI-SUBSCRIBER IDENTITY MODULE DEVICES

BACKGROUND

In a Dual Subscriber Identity Module (SIM) Dual Standby (DSDS) mobile communication device that support two subscriptions with single or dual radios installed, both subscriptions can be in Global System for Mobile communications (GSM) mode. For example, the first subscription may be in GSM mode with circuit-switched (CS) and packet-switched (PS) services, and the second subscription may be in GSM mode with only CS services. During cell reselection on the first subscription a five-second timer is started upon detecting a neighbor cell that meets all reselection criteria. The reselection criteria must be met for the duration of the five-second time period in order for the mobile communication device to select that neighbor cell to camp on.

The DSDS mobile communication device shares a single radio frequency (RF) chain between the two subscriptions. Since the RF chain is shared, the first subscription may or may not have access to the RF chain while the five-second timer is running or after expiration thereof. For example, the second subscription may be using the RF chain to engage in other high priority activity like short message service (SMS), a voice call, etc. As a result, a detected neighbor cell may or may not meet the cell reselection requirements for the duration of the five-second timer and the mobile communication device may end up camping on a cell which may not be the best cell.

SUMMARY

Apparatuses and methods for managing cell reselection in multi-SIM devices are provided.

According to various embodiments there is provided a method. In some embodiments, the method may include: selecting a best neighbor cell of a currently serving cell for a first subscription; starting a reselection timer; performing a plurality of signal measurements on the best neighbor cell; determining if a time period indicated by the reselection timer is expired; in response to a determination that the time period is expired, determining if a second subscription is engaged in an activity having higher priority than cell reselection; and in response to a determination that the second subscription is engaged in the activity having higher priority than cell reselection, inhibiting cell reselection on the first subscription.

According to various embodiments there is provided a mobile communication device. In some embodiments, the mobile communication device may include: a communication unit configured to communicate with one or more communication networks; and a control unit.

The control unit may be configured to: cause the communication unit to select a best neighbor cell of a currently serving cell for a first subscription; start a reselection timer configured to time a reselection time period; perform a plurality of signal measurements on the selected neighbor cell; determine if a time period indicated by the reselection timer is expired; in response to a determination that the time period is expired, determine if a second subscription is engaged in an activity having higher priority than cell reselection; and in response to a determination that the second subscription is engaged in an activity having higher priority than cell reselection, cause the communication unit to inhibit cell reselection on the first subscription.

According to various embodiments there is provided a non-transitory computer readable medium having stored therein a program. In some embodiments, the program may include processor executable instructions for performing operations including: selecting a best neighbor cell of a currently serving cell for a first subscription; starting a reselection timer; performing a plurality of signal measurements on the selected neighbor cell; determining if a time period indicated by the reselection timer is expired; in response to a determination that the time period is expired, determining if a second subscription is engaged in an activity having higher priority than cell reselection; and in response to a determination that the second subscription is engaged in the activity having higher priority than cell reselection, inhibiting cell reselection on the first subscription.

According to various embodiments there is provided a mobile communication device. In some embodiments, the mobile communication device may include: means for selecting a best neighbor cell of a currently serving cell for a first subscription; means for starting a reselection timer; means for performing a plurality of signal measurements on the best neighbor cell; means for determining if a time period indicated by the reselection timer is expired; means for determining if a second subscription is engaged in an activity having higher priority than cell reselection in response to a determination that the time period is expired; and means for inhibiting cell reselection on the first subscription in response to a determination that the second subscription is engaged in the activity having higher priority than cell reselection.

Other features and advantages of the present inventive concept should be apparent from the following description which illustrates by way of example aspects of the present inventive concept.

BRIEF DESCRIPTION OF THE DRAWINGS

Aspects and features of the present inventive concept will be more apparent by describing example embodiments with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Figure 1:
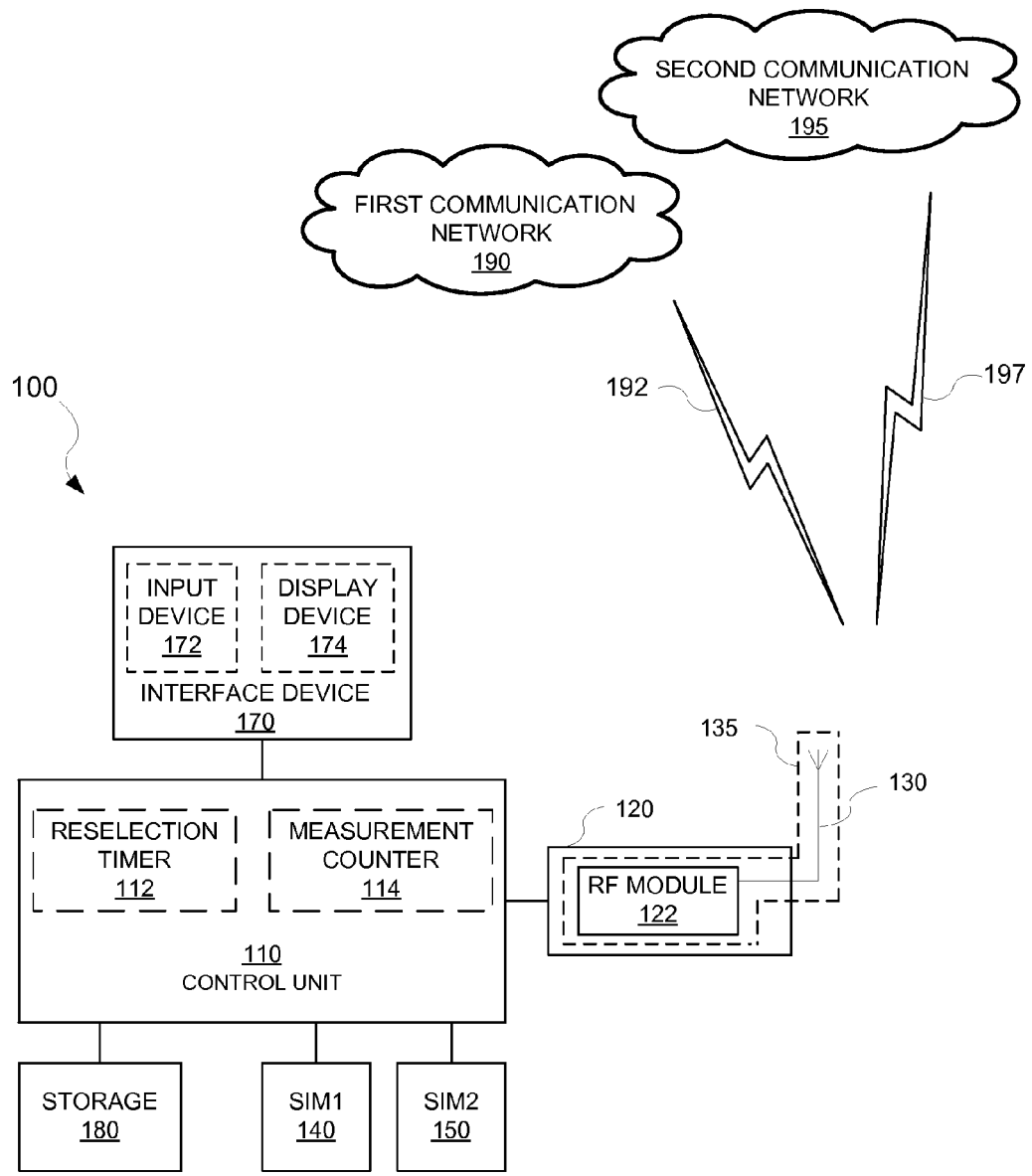
FIG. 1 is a block diagram illustrating a mobile communication device according to various embodiments.

FIG. 1 is a block diagram illustrating a mobile communication device 100 according to various embodiments. As illustrated in FIG. 1, the mobile communication device 100 may include a control unit 110, a communication unit 120, an antenna 130, a first SIM 140, a second SIM 150, a user interface device 170, and a storage 180.

The mobile communication device 100 may be, for example but not limited to, a mobile telephone, smartphone, tablet, computer, etc., capable of communications with one or more wireless networks. One of ordinary skill in the art will appreciate that the mobile communication device 100 may include one or more transceivers (communications units) and may interface with one or more antennas without departing from the scope of the present inventive concept.

The communication unit 120 may include, for example, but not limited to, an RF module 122. The RF module 122 may include, for example, but not limited to a first transceiver (not shown). An RF chain 135 may include, for example, but not limited to the antenna 130 and the RF module 122.

The first SIM 140 may associate the communication unit 120 with a first subscription (Sub1) 192 on a first communication network 190 and the second SIM 150 may associate the communication unit 120 with a second subscription (Sub2) 197 on a second communication network 195. For convenience, throughout this disclosure Sub1 192 is identified as the data subscription (i.e., CS+PS) and Sub2 197 is identified as the voice subscription (i.e., CS). One of ordinary skill in the art will appreciate that either subscription may be a data and/or voice subscription without departing from the scope of the present inventive concept.

For convenience, the various embodiments are described in terms of DSDS mobile communication devices. However, one of ordinary skill in the art will appreciate that the present inventive concept may be extended to Multi-SIM Multi-Standby (MSMS) mobile communication devices without departing from the scope of protection.

The first communication network 190 and the second communication network 195 may be operated by the same or different service providers, and/or may support the same or different radio access technologies (RATs), for example, but not limited to, GSM, CDMA, WCDMA, and LTE.

The user interface device 170 may include an input device 172, for example, but not limited to a keyboard, touch panel, or other human interface device, and a display device 174, for example, but not limited to, a liquid crystal display (LCD), light emitting diode (LED) display, or other video display. One of ordinary skill in the art will appreciate that other input and display devices may be used without departing from the scope of the present inventive concept.

The control unit 110 may be configured to control overall operation of the mobile communication device 100 including control of the communication unit 120, the user interface device 170, and the storage 180. The control unit 110 may be a programmable device, for example, but not limited to, a microprocessor (e.g., general-purpose processor, baseband modem processor, etc.) or microcontroller.

The control unit 110 may include a reselection timer 112 configured to time a predetermined time interval, for example a five second interval or other time interval, during which neighbor cell (NCell) measurements may be made. The control unit 110 may also include a measurement counter 114 configured to count a number of successful NCell measurements made for a selected NCell. Alternatively, the reselection timer 112 and/or the measurement counter 114 may be implemented as electronic circuitry separate from the control unit 110.

The storage 180 may be configured to store operating systems and/or application programs for operation of the mobile communication device 100 that are executed by the control unit 110, as well as to store application data and user data.

In various embodiments, when the mobile communication device 100 camps on a cell, the mobile communication device 100 may receive from the network (e.g., the first communication network 190) a list of NCells for the cell currently serving the mobile communication device 100. The NCells may be identified by broadcast control channel (BCCH) carrier frequencies. The mobile communication device 100 may periodically measure the received signal power level (RxLev) of the BCCH carrier frequencies of the NCells. If the control unit 110 determines that one of the NCells has met the cell reselection criteria, the control unit 110 may measure the RxLev of the selected NCell carrier frequency and may evaluate the cell reselection criteria based on the RxLev measurements during a time period of five seconds. The reselection timer 112 may time the five second period. The measurement counter 114 may count the number of successful measurements.

Figure 2:
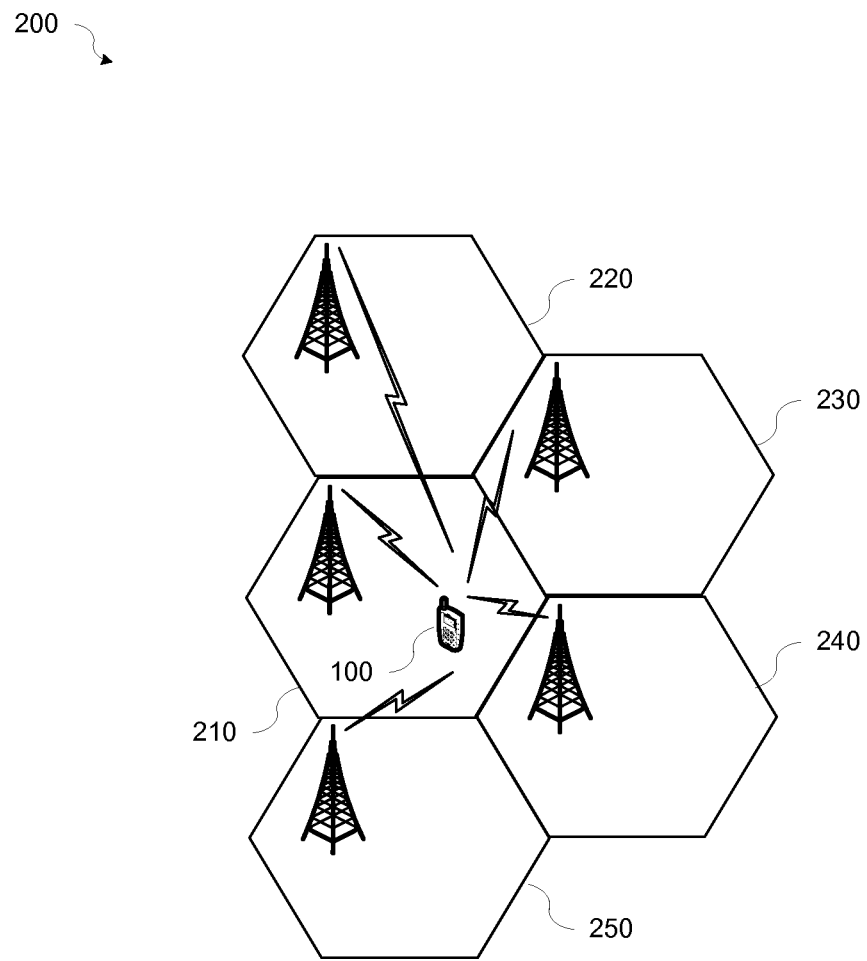
FIG. 2 is a diagram illustrating an example network environment.

FIG. 2 is a diagram illustrating an example network environment 200. Referring to FIGS. 1 and 2, the mobile communication device 100 may be camped on a serving cell 210. While camped on the serving cell 210, the mobile communication device 100 may monitor the RxLev of the BCCH carrier frequencies of the NCells (e.g., NCells 220, 230, 240, 250). When the control unit 110 determines that cell reselection is required, the control unit 110 may select one of the NCells (e.g., NCell 240) and may determine if the selected NCell meets reselection criteria for a period of time.

Figure 3:
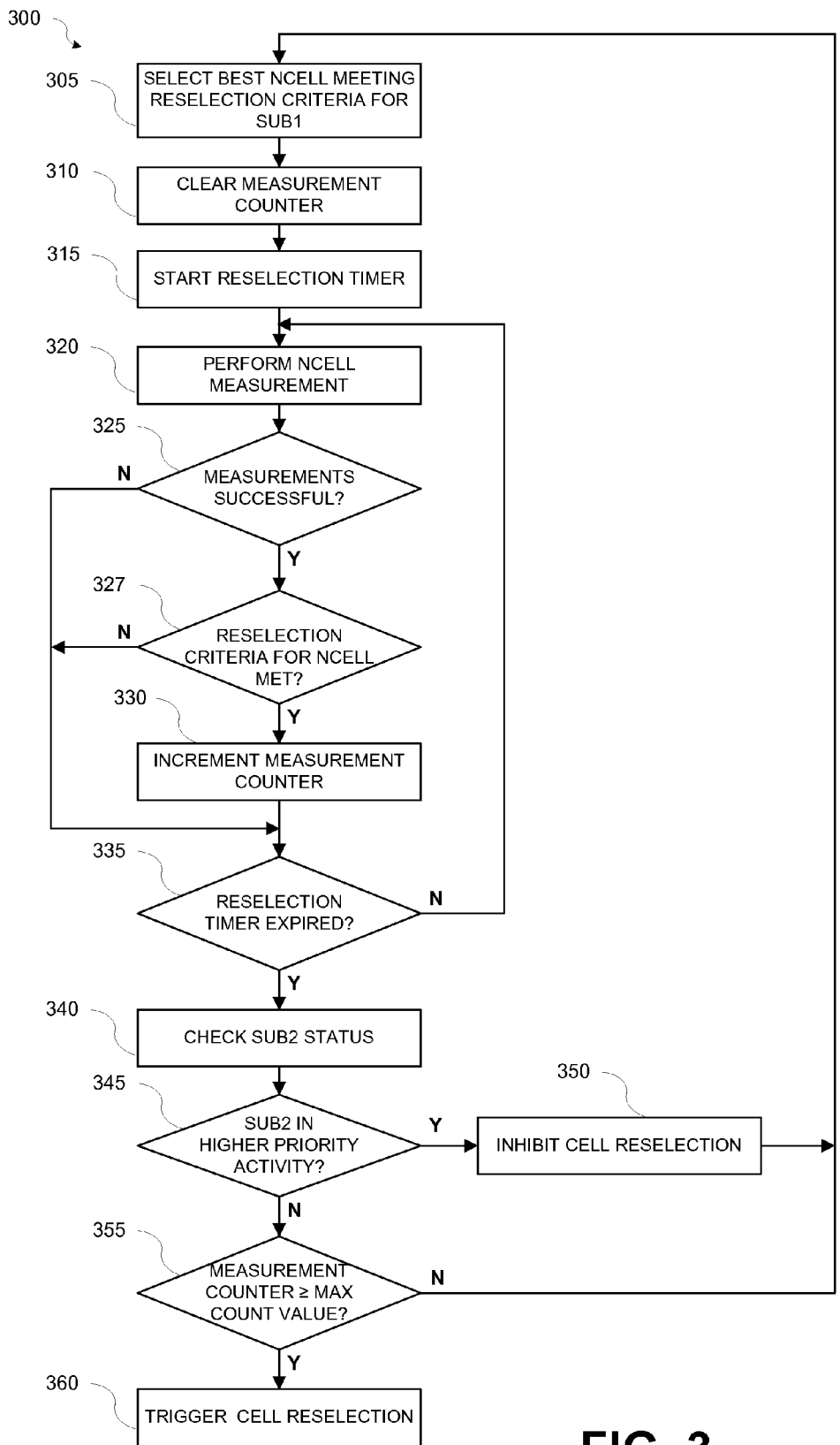
FIG. 3 is a flowchart illustrating a method according to various embodiments.

FIG. 3 is a flowchart illustrating a method 300 according to various embodiments. Referring to FIGS. 1-3, the control unit 110 may cause the communication unit 120 to select a best NCell (e.g., NCell 240) for Sub1 192 for which cell reselection criteria are met (305). A best NCell may be an NCell having a highest reselection criterion. To determine the NCell having the highest reselection criterion (i.e., the best NCell), the control unit 110 may evaluate several factors, for example, but not limited to, average received signal level, minimum received signal level, maximum transmit power used by the mobile communication device 100, power offset used by mobile communication device 100, and parameters received by the mobile communication device 100 on the BCCH of the NCell.

The control unit 110 may initialize (i.e., set to zero or another initial value) the measurement counter 114 (310) and start the reselection timer 112 (315). The reselection timer 112 may be, for example, but not limited to, a five-second timer. The control unit 110 may perform measurements, for example, but not limited to, RxLev measurements, on the selected NCell (320). For example, the control unit 110 may cause the communication unit 120 to attempt to obtain control of the RF chain 135 for Sub1 192 to perform the RxLev measurements or other measurements on the received signal of the selected NCell.

The control unit 110 may determine if the NCell measurements are successful (325). If the NCell measurements are successful (325-Y), the control unit 110 may determine if the reselection criteria for the selected NCell are met (327). If the reselection criteria for the selected NCell are met (327-Y), the control unit 110 may increment the measurement counter 114 (330). If the NCell measurements are not successful (325-N), for example, if the control unit 110 is unable to gain control of the RF chain 135 for Sub1 192, or the reselection criteria for the selected NCell are not met (327-N), the control unit 110 may not increment the measurement counter 114.

Then following operations 327 or 330, the control unit 110 may determine if the reselection timer 112 has expired (335). If the control unit 110 determines that the reselection timer 112 has not expired (335-N), the control unit 110 may attempt another measurement of the selected NCell at operation 320.

If the control unit 110 determines that the reselection timer 112 has expired (335-Y), the control unit 110 may check the status of Sub2 197 (340). Sub2 197 may be using the RF chain 135 to engage in a high priority activity. A high priority activity may be an activity having a higher priority than reselection, for example but not limited to, short message service (SMS), a voice call, etc. While engaged in a high priority activity Sub2 197 may not relinquish control of the RF chain 135 to Sub1 192 to perform NCell measurements. If the control unit 110 determines that Sub2 197 is engaged in a high priority activity (345-Y), the control unit 110 may cause the communication unit 120 to inhibit cell reselection on Sub1 192 (350) and may again select the best NCell having the highest reselection criterion for Sub1 192 at operation 305. The best NCell may be the best NCell previously selected (e.g., NCell 240) or the best NCell may be an NCell different (e.g., NCell 230) than the best NCell previously selected.

If the control unit 110 determines that Sub2 197 is not engaged in a high priority activity (345-N), the control unit 110 may determine whether the measurement counter 114 value is equal to or greater than a maximum count value (355). The maximum count value may indicate successful performance of a number of NCell measurements. The maximum count value may be five successful NCell measurements or another number of successful NCell measurements. If the control unit 110 determines that the measurement counter 114 value is equal to or greater than the maximum count value (355-Y), the control unit 110 may trigger the communication unit 120 to perform cell reselection on Sub1 192 (360).

If the control unit 110 determines that the measurement counter 114 value is not equal to or greater than the maximum count value (355-N), the control unit 110 may cause the communication unit 120 to again select the best NCell having the highest reselection criterion for Sub1 192 at operation 305. The best NCell may be the best NCell previously selected (e.g., NCell 240) or the best NCell may be an NCell different (e.g., NCell 230) than the best NCell previously selected.

The method 300 described with respect to FIG. 3 may be embodied on a non-transitory computer readable medium, for example, but not limited to, the storage 180 or other non-transitory computer readable medium known to those of skill in the art, having stored therein a program including computer executable instructions for making a processor, computer, or other programmable device execute the operations of the methods.

The accompanying claims and their equivalents are intended to cover such forms or modifications as would fall within the scope and spirit of the protection. For example, the example apparatuses, methods, and systems disclosed herein can be applied to multi-SIM wireless devices subscribing to multiple communication networks and/or communication technologies. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present inventive concept.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for cell reselection for a mobile communication device, the method comprising:
   selecting a best neighbor cell of a currently serving cell for a first subscription;
   starting a reselection timer;
   performing a plurality of signal measurements on the best neighbor cell;
   determining when a time period indicated by the reselection timer is expired;
   in response to a determination that the time period is expired, determining when a second subscription is engaged in an activity having higher priority than cell reselection; and
   in response to a determination that the second subscription is engaged in the activity having higher priority than cell reselection, inhibiting cell reselection on the first subscription.

2. The method of claim 1, wherein the best neighbor cell is a neighbor cell having a highest reselection criterion.

3. The method of claim 1, further comprising:
   initializing a measurement counter value prior to starting the reselection timer;
   determining when the signal measurements are successful;
   determining when reselection criteria for the best neighbor cell are met; and
   in response to a determination that the signal measurements are successful and the reselection criteria for the best neighbor cell are met, incrementing the measurement counter value.

4. The method of claim 1, wherein
   the first subscription is associated with a first radio access technology (RAT), and
   the second subscription is associated with a second RAT.

5. The method of claim 3, further comprising:
   in response to a determination that the second subscription is not engaged in the activity having higher priority than cell reselection after the time period is expired:
      determining when the measurement counter value is equal to or greater than a maximum count value; and
      in response to a determination that the measurement counter value is not equal to or greater than the maximum count value, selecting again a best neighbor cell of a currently serving cell for the first subscription.

6. The method of claim 4, wherein the first RAT is different from the second RAT.

7. The method of claim 5, further comprising:
   in response to a determination that the measurement counter value is equal to or greater than the maximum count value, triggering the cell reselection to the best neighbor cell.

8. The method of claim 5, wherein the best neighbor cell is the best neighbor cell previously selected.

9. The method of claim 5, wherein the best neighbor cell is a neighbor cell different than the best neighbor cell previously selected.

10. A mobile communication device, comprising:
    a communication unit configured to communicate with one or more communication networks; and
    a control unit configured to:
       cause the communication unit to select a best neighbor cell of a currently serving cell for a first subscription;
       start a reselection timer configured to time a reselection time period;
       perform a plurality of signal measurements on the selected neighbor cell;
       determine when a time period indicated by the reselection timer is expired;
       in response to a determination that the time period is expired, determine when a second subscription is engaged in an activity having higher priority than cell reselection; and
       in response to a determination that the second subscription is engaged in an activity having higher priority than cell reselection, cause the communication unit to inhibit cell reselection on the first subscription.

11. The mobile communication device of claim 10, wherein the best neighbor cell is a neighbor cell having a highest reselection criterion.

12. The mobile communication device of claim 10, wherein the control unit is further configured to:
    initialize a value of a measurement counter prior to starting the reselection timer;
    determine when the signal measurements are successful;
    determine when reselection criteria for the best neighbor cell are met; and
    increment the measurement counter value in response to a determination that the signal measurements are successful and the reselection criteria for the best neighbor cell are met.

13. The mobile communication device of claim 10, wherein
    the first subscription is associated with a first radio access technology (RAT), and
    the second subscription is associated with a second RAT.

14. The mobile communication device of claim 12, wherein the control unit is further configured to:
    in response to a determination that the second subscription is not engaged in the activity having higher priority than cell reselection after the time period is expired:
       determine when the measurement counter value is equal to or greater than a maximum count value; and
       select again a best neighbor cell of a currently serving cell for the first subscription in response to a determination that the measurement counter value is not equal to or greater than the maximum count value.

15. The mobile communication device of claim 13, wherein the first RAT is different from the second RAT.

16. The mobile communication device of claim 14, wherein the control unit is further configured to:
    trigger the cell reselection to the best neighbor cell in response to a determination that the measurement counter value is equal to or greater than the maximum count value.

17. The mobile communication device of claim 14, wherein the best neighbor cell is the best neighbor cell previously selected.

18. The mobile communication device of claim 14, wherein the best neighbor cell is a neighbor cell different than the best neighbor cell previously selected.

19. A non-transitory computer readable medium having stored therein a program for causing one or more processors to perform a method for cell reselection for a mobile communication device, the program including processor executable instructions for performing operations comprising:

selecting a best neighbor cell of a currently serving cell for a first subscription;

starting a reselection timer;

performing a plurality of signal measurements on the selected neighbor cell;

determining when a time period indicated by the reselection timer is expired;

in response to a determination that the time period is expired, determining when a second subscription is engaged in an activity having higher priority than cell reselection; and in response to a determination that the second subscription is engaged in the activity having higher priority than cell reselection, inhibiting cell reselection on the first subscription.

20. A mobile communication device, comprising:

means for selecting a best neighbor cell of a currently serving cell for a first subscription;

means for starting a reselection timer;

means for performing a plurality of signal measurements on the best neighbor cell;

means for determining when a time period indicated by the reselection timer is expired;

means for determining when a second subscription is engaged in an activity having higher priority than cell reselection in response to a determination that the time period is expired; and means for inhibiting cell reselection on the first subscription in response to a determination that the second subscription is engaged in the activity having higher priority than cell reselection.

\* \* \* \* \*